United States Patent
Brown

[11] 3,967,111
[45] June 29, 1976

[54] PULSED LIGHT SOURCE DISCRIMINATOR SYSTEM

[75] Inventor: Roger M. Brown, Mountain View, Calif.

[73] Assignee: Scientific Technology Incorporated, Mountain View, Calif.

[22] Filed: Dec. 20, 1974

[21] Appl. No.: 534,728

[52] U.S. Cl. .............................. 250/206; 250/214 R; 250/222 R; 356/5
[51] Int. Cl.² ......................................... H01J 39/12
[58] Field of Search ................ 250/206, 214 R, 552, 250/221, 222, 203 R; 356/4, 5

[56] References Cited
UNITED STATES PATENTS

| | | |
|---|---|---|
| 3,400,270 | 9/1968 | Durig .................................... 250/206 |
| 3,443,109 | 5/1969 | Broom et al. ........................ 250/552 |
| 3,463,928 | 8/1969 | Murphy ................................ 307/311 |
| 3,654,478 | 4/1972 | Fuwa .................................... 250/206 |
| 3,708,678 | 1/1973 | Krepa .............................. 250/214 X |
| 3,719,938 | 3/1973 | Perlman ........................... 250/214 X |
| 3,772,523 | 11/1973 | Montanvert et al. ............... 250/552 |

Primary Examiner—Walter Stolwein
Attorney, Agent, or Firm—Flehr, Hohbach, Test, Albritton & Herbert

[57] ABSTRACT

A system sensitive to light pulses which are substantially synchronous with a selected pulsed light source containing frequency components within the pulse which are above a predetermined frequency. A signal for exciting the selected pulsed light source is frequency modulated and connected to an AND gate as well as to the pulsed light source device. The pulsed light is received and conditioned producing a received signal which is also connected to the AND gate. Gate output occurs only during the period of time the received signal is in time coincidence with the frequency modulated pulsed light source excitation signal. Additional light pulses transmitted in the immediate area of the receiver by additional light pulse transmitting devices having frequency components within the light pulse above the predetermined frequency may be sensed by the receiver, but will not produce output at the AND gate unless in time coincidence with the frequency modulated signal. An occasional pulse or several pulses from the additional light source may, by chance, fall partially in time coincidence with the frequency modulated signal thereby producing one or several AND gate outputs in sequence. A step-charging filter receives the AND gate outputs requiring a predetermined number of sequential AND gate outputs to reach a predetermined filter output signal level. Thus the frequency modulated signal and the received signal must be in time coincidence for the predetermined number of sequential received pulses before the charging filter produces an output which initiates the system output. In this fashion a plurality of proximate pulsed light sensitive systems may operate with each system having a unique instantaneous transmitted light pulse frequency modulated phase by which associated receivers may discriminate between light pulse sources.

10 Claims, 7 Drawing Figures

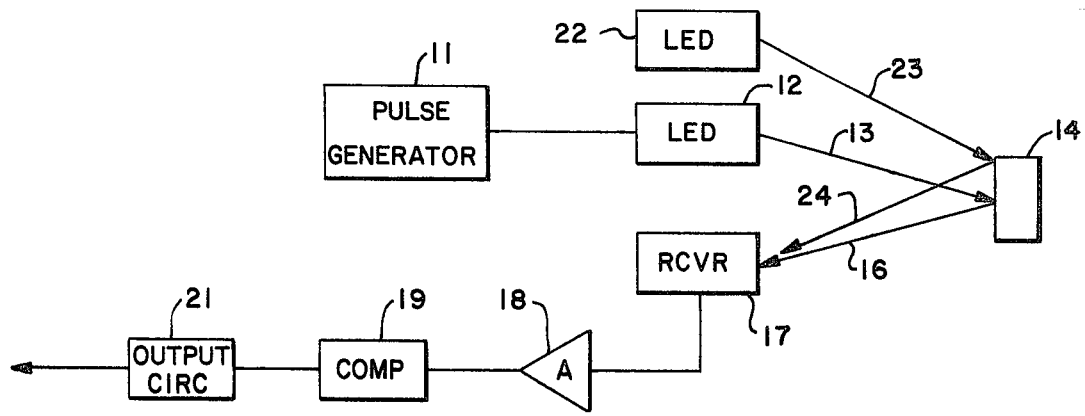
FIG.—1 (OLD ART)
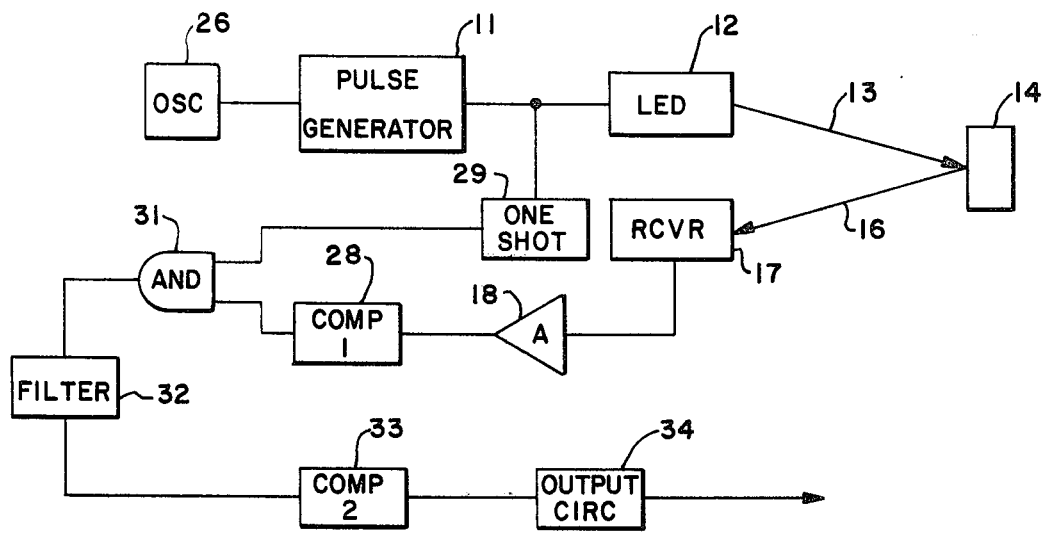
FIG.—2
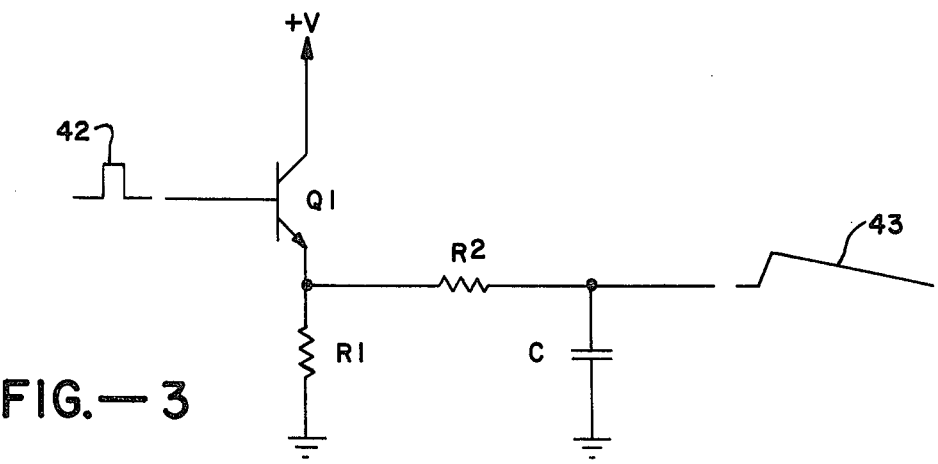
FIG.—3

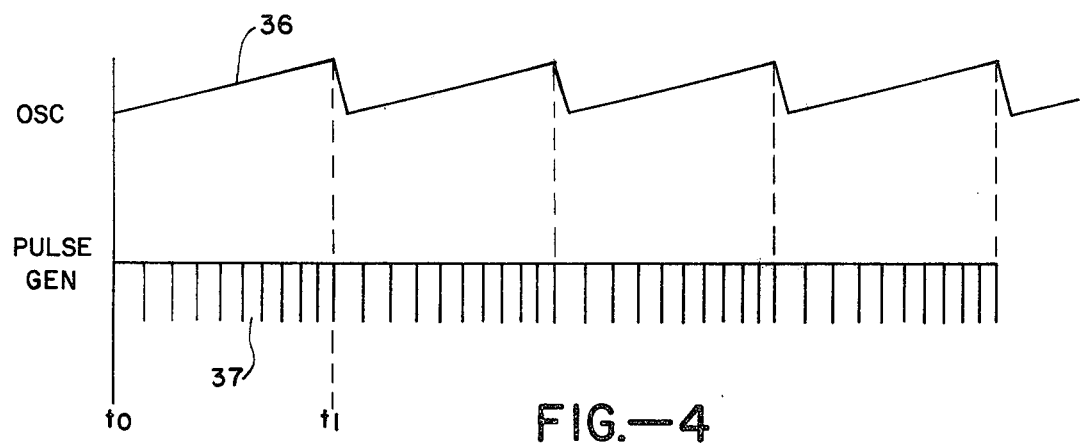
FIG.—4
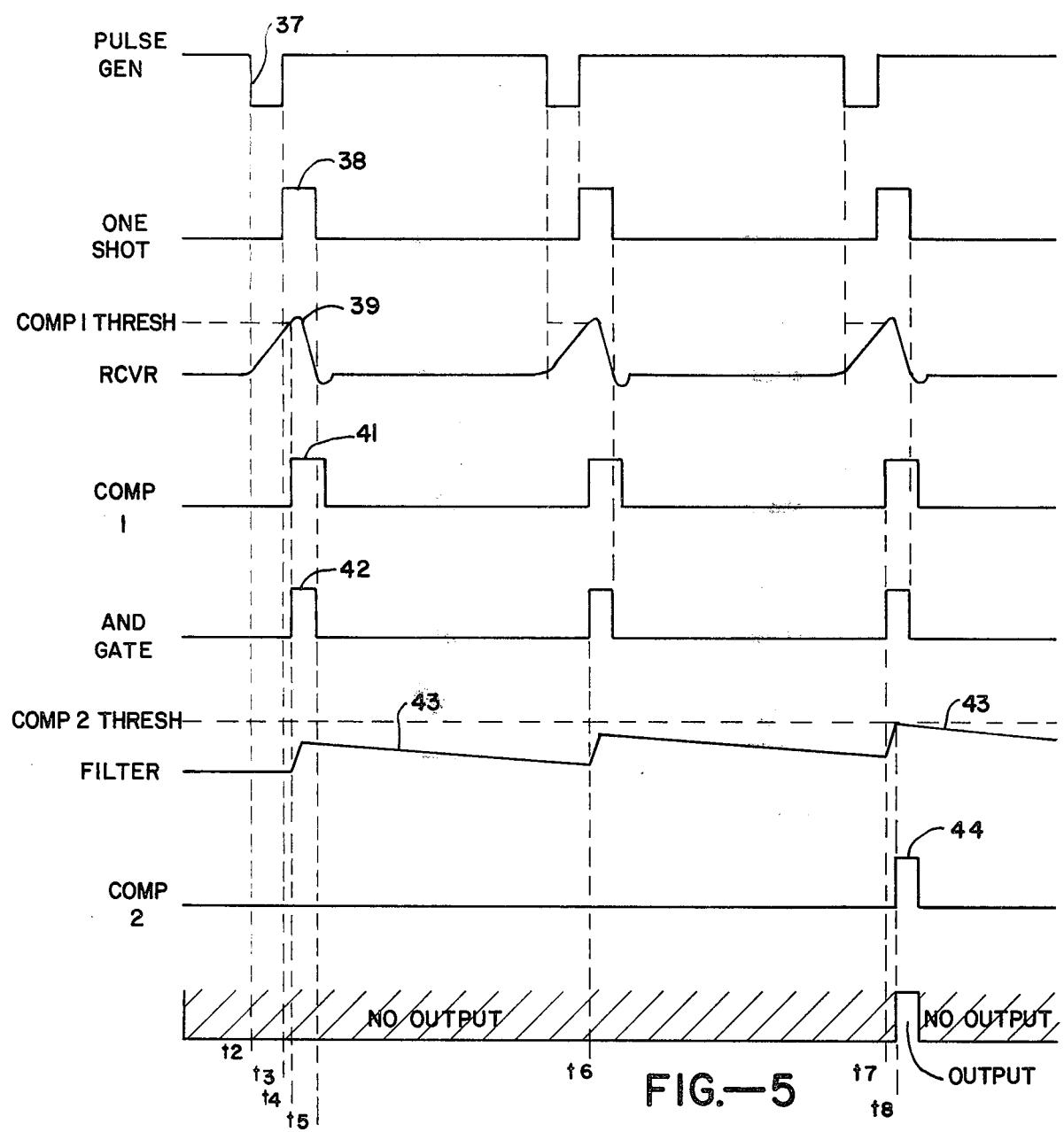
FIG.—5

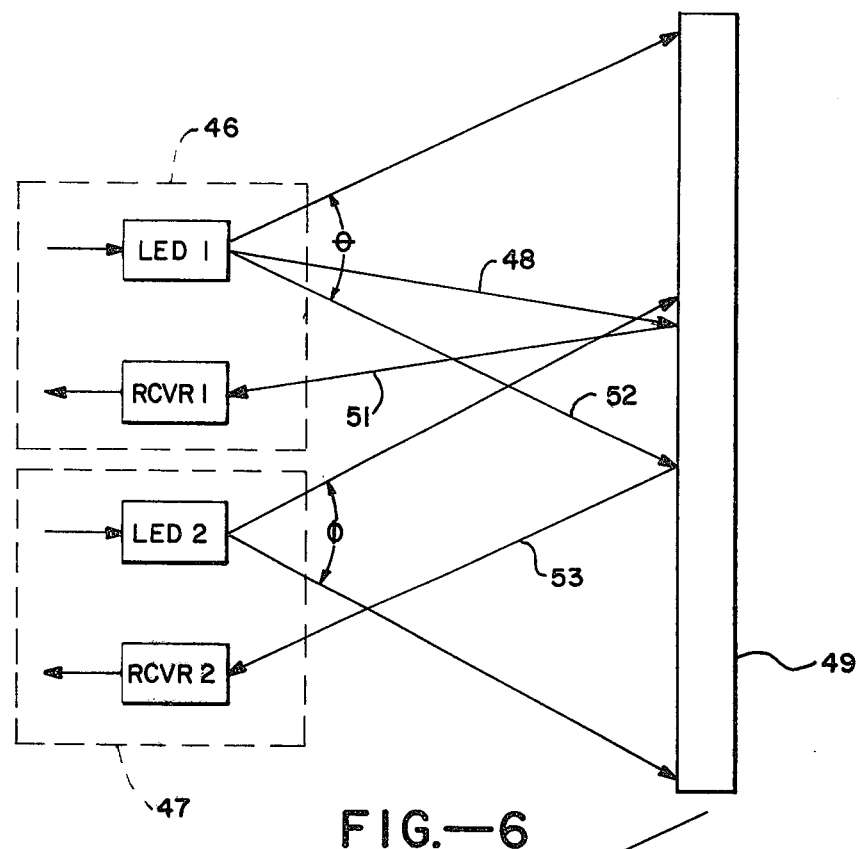
FIG.—6
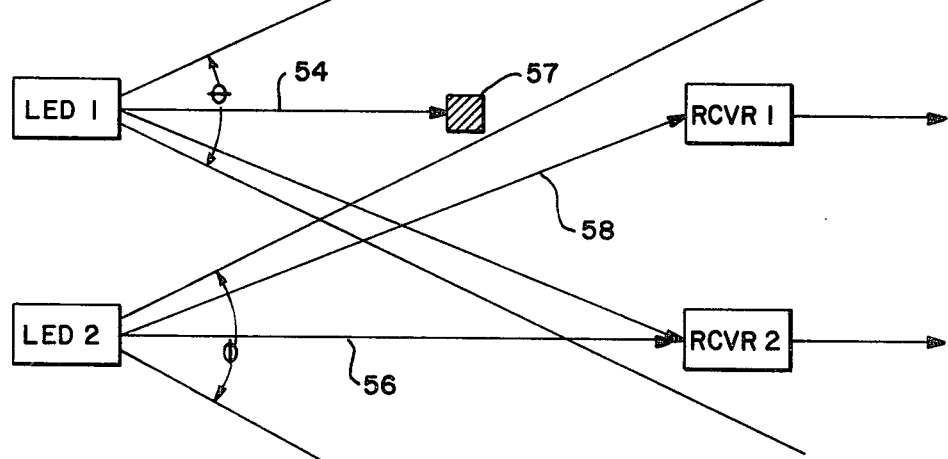
FIG.—7

PULSED LIGHT SOURCE DISCRIMINATOR SYSTEM

BACKGROUND OF THE INVENTION

This invention relates to a system sensitive to a preselected one among a plurality of impinging light pulse trains, and more particularly to a light pulse discriminating system which may be used in proximity with one or more other light pulsing systems without being effected thereby.

Pulsed light systems for detecting target presence and/or range exhibit greater stability and less sensitivity to changes in ambient light conditions than steady state light level systems. Pulsed light systems such as the system disclosed in copending patent application Ser. No. 383,786 now issued as U.S. Pat. No. 3,867,628 are capable of sensing light pulses having predetermined frequency components to the exclusion of all other light pulse frequencies present including ambient light. Such pulsed light systems are sensitive to each other, however, and may not be used in proximity to each other without running the risk of system errors due to receipt of light pulses from more than one pulsed light source. Since it is often necessary to operate such light pulse sensing systems simultaneously in confined areas there is a need for a system having the capability of discriminating between those light pulses which are intended to be received for producing system output and those light pulses which must be ignored by the system to prevent the presence of output error created thereby.

SUMMARY OF THE INVENTION AND OBJECTS

A light pulse discriminating system is disclosed which receives pulsed light from a light source which is excited by a signal from a pulse generator. The pulse generator has a voltage controlled oscillator characteristic, and has a substantially single frequency oscillator connected to the control input. The pulse generator thereby provides a frequency modulated output, cyclic in nature, producing light pulses from the light source of the same characteristic. A receiver is provided for receiving the light pulses. The frequency modulated pulse generator output provides a first gating signal and the receiver provides an output representing a second gating signal. The first and second gating signals are connected to means for providing a system output signal when the first and second gating signals are in time coincidence.

In general it is an object of the present invention to provide a light pulse discriminating system which may be used in proximity with other light pulsing systems which is sensitive to its own transmitted light pulses only.

Another object of the present invention is to provide a light pulse discriminating system with a frequency modulated light pulse output in random phase relationship with adjacent light pulse sources.

Another object of the present invention is to provide a light pulse discriminating system which may be in phase with spurious light pulses for less than a predetermined number of sequential pulses without providing system output.

Additional objects and features of the present invention will appear from the following description in which the preferred embodiment has been set forth in detail in conjunction with the accompanying drawings.

BRIEF DESCRIPTION OF THE DRAWINGS

FIG. 1 is a block diagram of a light pulsing target sensitive or ranging system which is known in the art.

FIG. 2 is a block diagram of a pulse discriminating target sensing and ranging system.

FIG. 3 is a schematic diagram of the step-charging filter of FIG. 2.

FIG. 4 is a signal timing diagram showing the frequency modulated output of the pulse generator.

FIG. 5 is a signal timing diagram for the light pulse receiving circuitry in FIG. 2.

FIG. 6 is a diagram showing one application of the disclosed invention.

FIG. 7 is a diagram showing another application of the disclosed invention.

DESCRIPTION OF THE PREFERRED EMBODIMENT

In copending patent application Ser. No. 383,786, filed July 30, 1973, now issued as U.S. Pat. No. 3,867,628 for a PULSED LIGHT RECEIVER AND METHOD there is described a receiver which is sensitive to light pulses having pulse frequency components therein which are above a predetermined frequency. The device disclosed therein has the capability of distinguishing between a light pulse, receipt of which is desirable for producing system output, and ambient or spurious light pulses which have light pulse frequency components below the predetermined frequency. It should be noted here that the light pulse frequency components to which reference is made are those sinusoidal frequencies which are contained in the light pulse wave form, and not to the radiant energy propagation frequencies of the light energy itself. It should also be noted that the term "light" as used herein includes any radiation in the electromagnetic spectrum and is not limited to visible light. Thus, the light pulses may be from any source emitting electromagnetic energy.

If one or more of the above referenced devices are operated in proximity with one another the signals in the form of light pulses generated thereby may be received by adjacent receivers thereby imparting error to the receiver output. FIG. 1 shows a pulse generator 11 connected to a light pulsing device such as light emitting diode (LED) 12 which transmits a beam of light 13 for impingement on a target 14. A certain amount of the light energy in light beam 13 is reflected from target 14 as reflected beam 16 which impinges upon receiver 17. Receiver 17 produces an electrical output signal which is connected to amplifier 18 for providing a signal level to comparator 19. When the threshold of comparator 19 is exceeded an output from comparator 19 results which is connected to output circuit 21 for providing an output signal indicative of either the presence of target 14 or the range of target 14 from receiver 17. The output signal may be produced by output circuit 21 if a spurious light source such as LED 22 produces an additional light beam 23 impinging upon target 14 and reflecting therefrom as reflected beam 24 to then impinge upon receiver 17.

A system is shown in FIG. 2 which is insensitive to light pulses such as those contained in spurious beam 23 of FIG. 1. An oscillator 26 is connected to the input of pulse generator 11. Pulse generator 11 is in the nature of a voltage controlled oscillator connected to the control input. In this embodiment oscillator 26 has a predetermined output which is hereinafter described and may have an output frequency in the range of 100 hertz for the purposes of this embodiment. Pulse generator 11 may have a median output frequency of approximately 1,000 hertz, being modulated thereabout in the preferred embodiment over a predetermined range of approximately plus and minus 5%. The output from pulse generator 11 is connected to a device such as LED 12 for providing light pulses having pulse frequency components above a predetermined frequency. The pulsed beam 13 is shown impinging on target 14 providing a reflected beam 16 as in FIG. 1 above which is received at receiver 17.

Receiver 17 of this embodiment is disclosed in the above referenced copending application Ser. No. 383,786 now issued as U.S. Pat. No. 3,867,628. As shown therein the circuit in receiver 17 includes a photo sensitive device such as a photo transistor which is biased to a predetermined constant conducting level by a constant current base input. The predetermined conducting level is set in dark conditions. A transistor has its base connected to the emitter of the photo transistor and has its collector connected to the base of the photo transistor. The emitter of the transistor is connected to ground. When light pulses lower than a predetermined frequency or steady state ambient light impinges upon the photo transistor, current through the photo transistor temporarily rises, thereby biasing the transistor connected to the emitter of the photo transistor to a conducting condition. A drain is thus provided for the constant current to the photo transistor base, thus reducing the current conducted through the photo transistor base. There is, however, a high pass filter associated with the base of the transistor which allows light pulses above the predetermined frequency to cause the photo transistor to conduct a pulse of current which bypasses the transistor base, preventing photo transistor base current drain and thereby providing a pulse output from the photo transistor collector. The photo transistor output is conditioned to provide the signal appearing as output from receiver 17 in this disclosure.

The receiver output in FIG. 2 is directed to an amplifier 18 having an output connected to comparator 28. The frequency modulated output of pulse generator 11 is connected to a one-shot signal generator 29 as well as LED 12. The output of one-shot generator 29 provides a first gating signal and the output of comparator 28 provides a second gating signal. The first and second gating signals are connected to the inputs of an AND gate 31 which provides an output when the first and second gating signals are in time coincidence. The output from AND gate 31 is delivered to a step-charging filter 32 which provides an output to comparator 33. When the output of filter 32 exceeds a predetermined level comparator 33 provides an output connected to output circuit 34 for providing a conditioned system output.

Turning now to the operation of the device described thus far it should be noted that the outside dimensions of the device package may be the same as that disclosed in copending application Ser. No. 383,786 now issued as U.S. Pat. No. 3,867,628, mentioned above. Referring to FIG. 4, the output 36 of oscillator 26 is seen as a sawtooth wave having a frequency for the purposes of discussion of about 100 hertz. Pulse generator 11 receiving sawtooth wave 36 at the control input provides an output 37 which is shown for purposes of this discussion as a median frequency of about 1,000 hertz. The variation in frequency of pulse 37 is cyclic, having a period from $t_0$ to $t_1$ and is exaggerated for the purpose of illustration in FIG. 4. The control provided by the sawtooth wave 36 is typically of the nature of plus and minus 5% of the median frequency of pulse generator output 37.

Turning to FIG. 5 pulse generator output 37 is shown in expanded scale. One-shot generator 29 is configured in this embodiment to provide a pulse 38 initiated by the rising trailing edge of pulse 37. Pulse 37 at time $t_2$ excites LED 12 as described above giving rise to transmitted light beam 13 and reflected light beam 16 which is received at receiver 17. The circuit of receiver 17 described heretofore provides receiver output pulse 39 having the approximate shape and phase as shown in FIG. 5. Receiver output pulse 39 is connected to the input of comparator 28 which in turn provides comparator output pulse 41 at time $t_3$ when pulse 39 passes through the indicated threshold voltage for comparator 28. One-shot pulse 38 and comparator pulse 41 provide the first and second gating pulses respectively for connection to the input of AND gate 31. AND gate 31 provides an output 42 for the period of time from $t_4$ to $t_5$ during which the gating pulses are in time coincidence.

At time $t_4$ when output pulse 42 is directed from AND gate 31 to the input of step-charging filter 32, an output 43 appears from filter 32 having a decay time longer than the period of time from $t_4$ through $t_6$. The subsequent output pulse 42 from AND gate 31 therefore provides another output 43 from filter 32 which has a higher level immediately subsequent to $t_6$ than it had immediately subsequent to $t_4$. In like manner, output 43 has yet a higher level at time $t_8$ immediately subsequent to time $t_7$. Output 43 is shown having reached the threshold of comparator 33 at time $t_8$. Comparator 33 provides an output 44 which is connected to the output circuit 34 for generating an output characteristic as desired.

The manner in which step-charging filter 32 functions is described by reference to FIG. 3. Output 42 from AND gate 31 is delivered to the base of transistor Q1. The collector of Q1 is connected to plus V and the emitter is connected to a resistor R1 to ground. A resistor R2 is also connected to the emitter of Q1. Capacitor C is connected between the opposite end of resistor R2 and ground. When output 42 is injected into the base of transistor Q1 the transistor conducts raising the emitter of Q1 above ground. This places a charge on capacitor C relative to ground. As pulse 42 disappears from the base of Q1 the charge on capacitor C discharges through R2 and R1 to ground. The R1-R2-C time constant is set to be considerably longer than the period from $t_4$ to $t_6$. For example, capacitor C may be allowed to discharge if pulse 42 is not present at the base of transistor Q1 at periods less than the time from $t_4$ to $t_7$. In this fashion sequential pulses 42 must appear at the base of transistor Q1 for the charge on capacitor C to build up to the threshold level of comparator 33. Thus, if a spurious transmitter light beam such as bean 23 were, by chance, to be in time coincidence with the output 38 from one-shot 29 for a series of pulses, the charge on capacitor C would build up as shown at 43 in FIG. 5. If step-charging filter 32 is constructed so as to require five sequential pulses 42 before output 43 reaches the threshold of comparator 33, then up to four such chance time coincident pulses arising from spurious transmitted light beam 23 may be tolerated before output circuit 34 generates an erroneous output. As may be immediately recognized, this remote probability of output error is tolerable.

The light pulse discriminator of FIG. 2 contains several discrimination features. The first involves the strength of the receiver output pulse 39 as determined by received reflected light beam 16. When the light energies are too low, receiver output pulse 39 will not exceed the threshold of comparator 28 and the second gating signal, which is the output 41 of comparator 28, will not occur. A second discrimination feature involves the time coincidence of the first and second gating signals 38 and 41 respectively. Chance time coincidence caused by light received at receiver 17 and generating receiver output 39 is possible for one or several cycles. In the event such chance coincidence occurs, step-charging filter 32 requires a predetermined number of such chance coincident light input signals at receiver 17 before the threshold of comparator 33 is exceeded, and output 44 produces consequent system output. Thus, a spurious light input must have an intensity level above a predetermined light intensity, must be in time coincidence with the preselected transmitted light beam 13, and must also remain in such time coincidence for a predetermined serial number of transmit cycles before erroneous system output will occur. These features adequately block the generation of system output from spurious light beam inputs at receiver 17.

It should be noted that the foregoing embodiment has been described in terms of a receiver having the characteristics disclosed in copending application Ser. No. 383,786 now issued as U.S. Pat. No. 3,867,628. For less sophisticated applications, a system may be utilized having lesser characteristics. For example, a light sensitive device may be included in receiver 17 together with circuitry which merely senses light pulses providing light intensities greater than ambient without pulse frequency component sensitivity. In such a rudimentary system the discriminating features of the invention disclosed herein, namely minimum light intensity threshold, time coincidence with transmitted light pulse, and a minimum number of sequential pulse time coincidences would provide discrimination over spurious local light pulses.

FIG. 6 shows a situation in which the disclosed invention is useful. A pair of light emitting diodes LED 1 and LED 2 are present on structures 46 and 47 movable relative to one another. Receiver 1 and receiver 2 are also present on structures 46 and 47. The remainder of the components as shown in FIG. 2 are also present on each of the structures 46 and 47. LED 1 has a light beam projection angle 9 as shown. LED 2 has a light beam projection angle $\phi$ as shown, similar to $\theta$. It may be seen from FIG. 6 that a light beam 48 from LED 1 will reflect from target 49 as reflected ray 51 to be received at receiver 1 in normal fashion as described above. It may also be seen that light ray 52 from LED 1 may reflect from target 49 to be received as reflected ray 53 at receiver 2. Utilizing the disclosed invention receiver 1 will properly sense reflected ray 51 and provide system output related thereto and receiver 2 will reflect reflected ray 53 leaving the output of the circuitry associated therewith free of error which might otherwise have been induced by the receipt of reflected ray 53.

FIG. 7 shows another use for the disclosed invention. LED 1 and receiver 1 have associated therewith the remainder of the circuitry shown in FIG. 2. In like manner LED 2 and receiver 2 are the transmitter and receiver of a complete system as shown in FIG. 2. The angles $\theta$ $\phi$ are the light beam transmission angles as described for FIG. 6. It may be seen that light pulses from LED 1 impinge not only on receiver 1 but on receiver 2. It may also be seen that light pulses from LED 2 impinge not only on receiver 2 but also on receiver 1. Such a system as seen in FIG. 7 could be used to detect interruption of the light beam from LED 1 to receiver 1 and from LED 2 to receiver 2. Since the circuitry associated with receiver 1 is able to discriminate between transmitted light pulse 54 from LED 1 and 56 from LED 2, an object 57 modifying light pulse 54 will provide an output from the circuitry associated with receiver 1 indicating such modification. Without the discriminating features disclosed herein receive 1 could continue to receive energy from LED 2 by way of light pulse 58 which would erroneously indicate no modification of light pulse 54.

A pulsed light source discriminator system has been disclosed having a modulated rate of light pulses, requiring received light pulses to be in time coincidence therewith. Moreover, a pulsed light source discriminator system is disclosed which requires a predetermined number of successive chance time coincident spurious light pulses before an erroneous system output is produced thereby. The system disclosed allows a plurality of light pulse sensing systems to be used adjacent to one another, each system sensing a predetermined train of light pulses only from a preselected light source.

I claim:

1. In a discrimination system for receiving pulsed light from a light source excited by an input signal from a pulse generator and having a light sensitive receiver which produces an electrical output signal in response to received light energy,
    means for periodically varying the frequency of the input signal from the pulse generator,
    means for receiving the input signal for producing a first gating signal having a predetermined time phase relative to the input signal,
    means for receiving the electrical output signal for producing a second gating signal having a predetermined time phase relative to the electrical output signal,
    means for receiving said first and second gating signals and producing a gated signal while said first and second gating signals are in time coincidence,
    and an output circuit for receiving said gated signals and producing a system output related to the discriminated pulsed light.

2. A discrimination system as in claim 1 wherein said means for receiving the electrical output signal comprises an amplifier and a voltage comparator connected in series, whereby said second gating signal occurs only when the electrical output is of sufficient magnitude to produce an amplifier output exceeding a predetermined level set in said voltage comparator, so that low level electrical output signals will not produce said gated signal.

3. A discrimination system as in claim 1 wherein said means for periodically varying the frequency of the input signal is an oscillator having a predetermined output wave shape and frequency, and the pulse generator is a voltage controlled oscillator, whereby the pulse generator frequency is constantly varying and spurious pulsed light frequencies from additional light sources having similar light pulse frequencies produce a second gating signal which is substantially out of time coincidence with said first gating signal.

4. A discrimination system as in claim 1 together with a step charging filter connected to receive said gated signal, whereby when said second gating signal is produced by electrical output signals in time coincidence with said first gating signal, a predetermined number of said gated signals must occur before said output circuit produces said system output.

5. A discrimination system as in claim 4 wherein said step charging filter comprises a transistor having a base emitter and collector, said collector connected to a voltage supply, said gated signal connected to said base, a capacitor connected between said emitter and ground, and a resistor in parallel with said capacitor, whereby when said gated signal is present said capacitor charges, and said resistor limits discharge when said gated signal is absent to a time longer than the period of said first gating signal.

6. A discrimination system as in claim 1 wherein said means for receiving the input signal is a one-shot multivibrator imposing a time delay in said first gating signal for providing time coincidence with said second gating signal.

7. A discriminator system for receiving pulsed light comprising
   a pulse generator for producing output pulses,
   an oscillator connected to said pulse generator for frequency modulation of said output pulses over a predetermined frequency range,
   a light source producing light pulses excited by said output pulses,
   a light sensitive receiver for receiving said light pulses and producing an electrical output related thereto,
   means for receiving said electrical output and producing a first gating signal in predetermined time phase therewith,
   means for receiving said pulses and producing a second gating signal in predetermined time phase therewith,
   and means for receiving said first and second gating signals for producing a gated signal when said first and second gating signals are in time phase,
   whereby the system is insensitive to spurious light energy signals at frequencies other than the instantaneous frequency of said light source.

8. A discriminator system as in claim 7 together with a step charging filter having a predetermined discharge time, and an output circuit for receiving said gated signal and producing a system output, whereby a predetermined number of gated signals must occur at a frequency having a period less than said discharge time before said system output is produced, so that spurious light energy signals may coincide with the instantaneous frequency of said light source for a number of cycles less than said predetermined number of gated signals before said system output is produced.

9. A method for discriminating between transmitted pulses from one light source and other transmitted light pulses received by a light sensitive receiver all at a median frequency, comprising the steps of
   modulating the frequency of light pulses from the one light source over a predetermined frequency band surrounding the median frequency,
   gating the desired received frequency pulses with the modulated frequency,
   and producing a system output from the gated frequency pulses,
   whereby light pulses received having a modulation frequency or phase distinct from those of the modulated frequency are rejected.

10. A method as in claim 9 together with the step of charging a filter with a predetermined number of successive gated frequency pulses, whereby received light pulses apart from the desired received frequency may coincide therewith for a number of cycles less than the predetermined number of successive gated frequency pulses without producing the system output.

* * * * *